Figure 4:
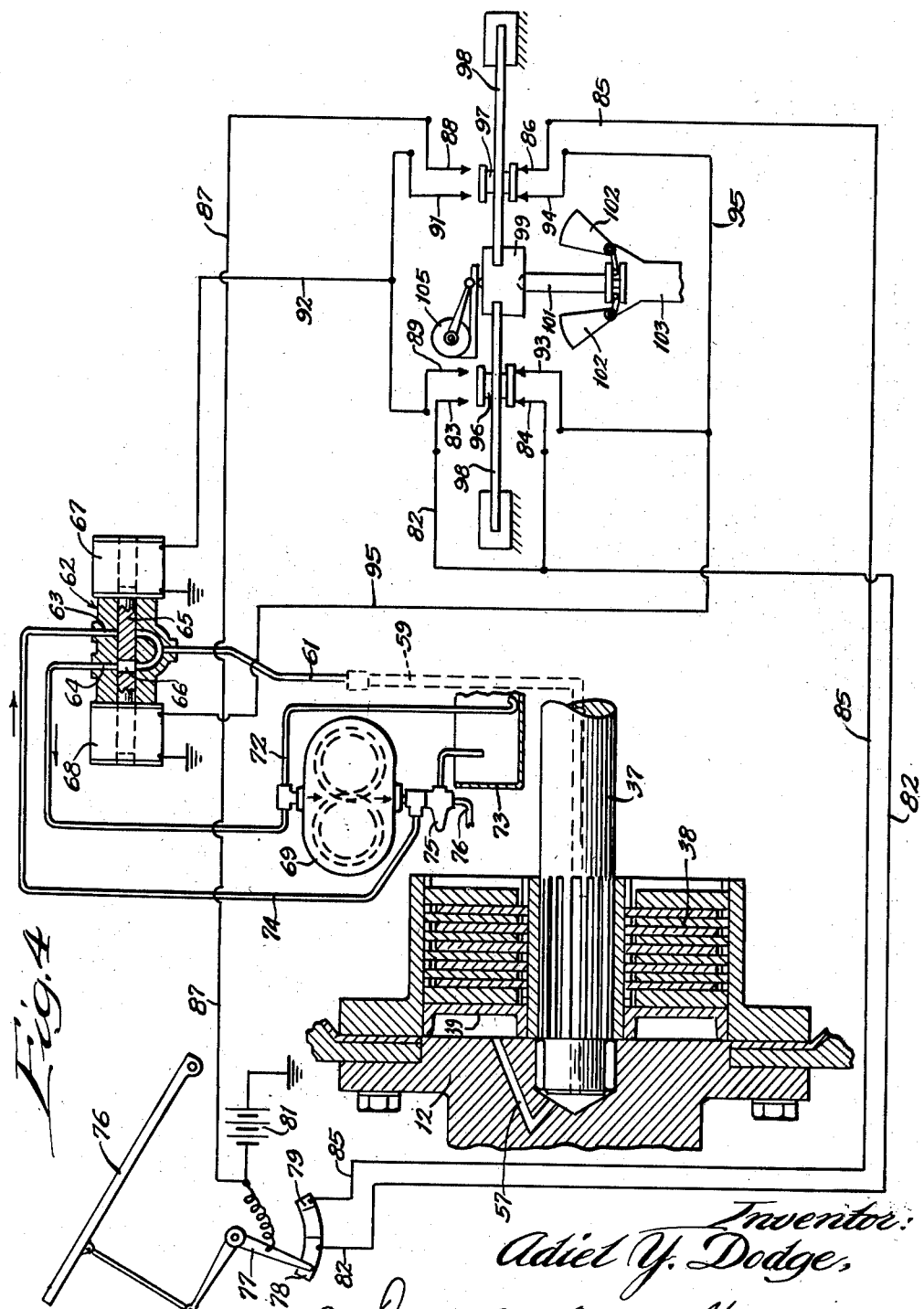

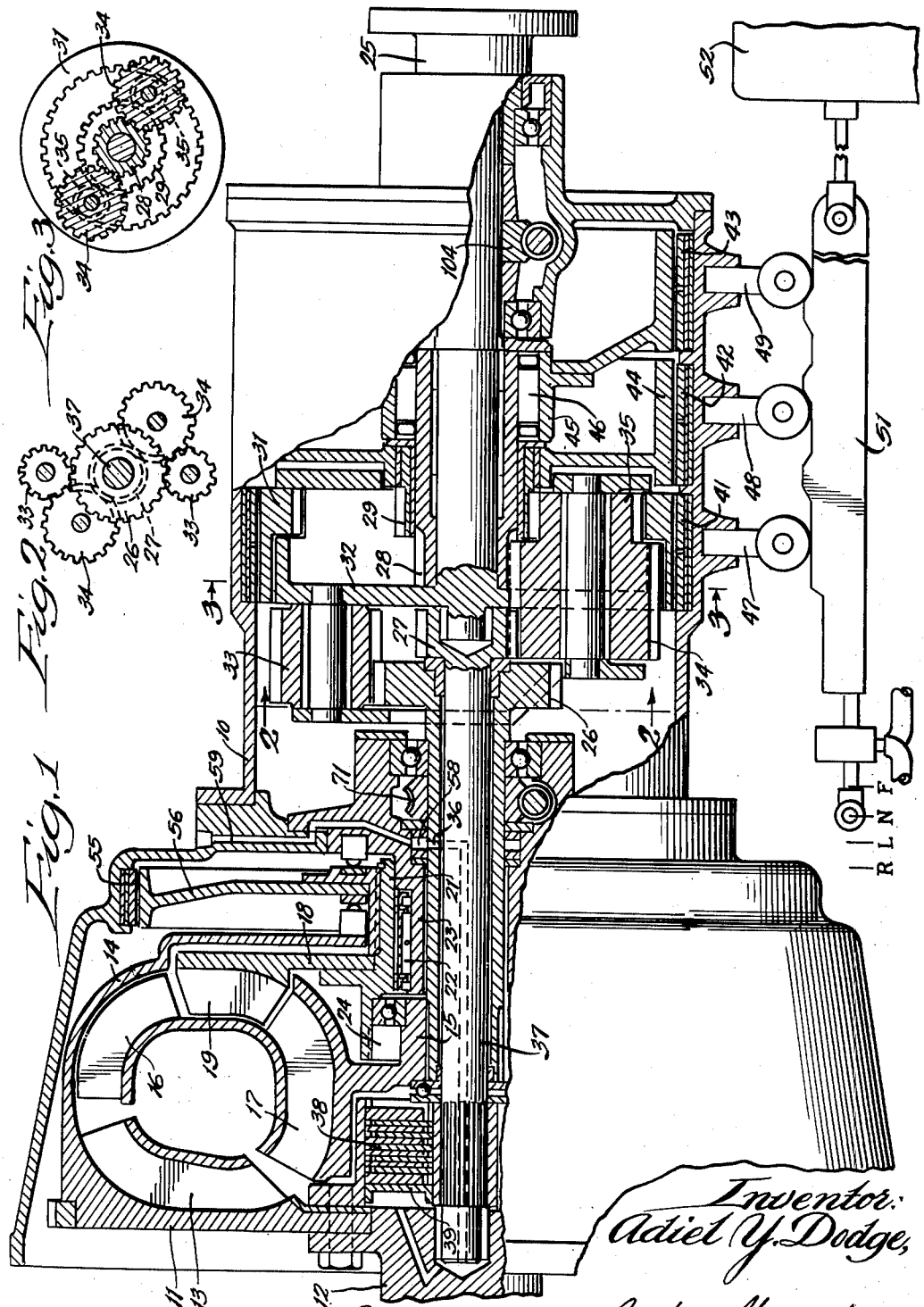

April 1, 1952

A. Y. DODGE 2,591,342

TRANSMISSION

Filed Oct. 1, 1948

2 SHEETS—SHEET 2

Inventor:
Adiel Y. Dodge,
By Dawson, Ooms, Booth and Spangenberg,
Attorneys.

UNITED STATES PATENT OFFICE 2,591,342

TRANSMISSION

Adiel Y. Dodge, Rockford, Ill.

Application October 1, 1948, Serial No. 52,187

4 Claims. (Cl. 74—732)

This invention relates to transmissions, and more particularly to variable range transmissions of the type adapted for use on automotive vehicles.

The invention relates specifically to automotive transmissions including a hydraulic torque converter in combination with a gear set which can be shifted or changed to provide a plurality of forward ranges plus reverse. Broadly speaking, transmissions of this type have heretofore been proposed but have failed either to provide the flexibility necessary for completely satisfactory operation, or have been so complicated and expensive to build and control that they have not been practical.

In prior transmissions using torque converters it has been neceessary to provide fairly high numerical ratio drives in the gearing so that the torque converter will operate in its relatively inefficient ranges for a minimum of time. In order to carry torque multiplication to satisfactory high speeds it has been necessary to use relatively small torque converters. This is in direct conflict with the necessity for a relatively large torque converter to provide good efficiency in direct drive. The present invention provides a solution to these problems by providing a series drive through the torque converter and gearing for relatively low speed high performance operation and a two path drive for moderate torque increase and for higher speed economical cruising.

It is one of the objects of the present invention to provide a transmission which is relatively simple to build, which will produce a plurality of forward ranges plus reverse, which provides extreme operating flexibility and which can be controlled very simply.

Another object is to provide a transmission in which changes from one operating range to another are produced by engaging or disengaging a single brake or clutch. This construction greatly simplifies the control operation by eliminating the necessity to synchronize the operation of a plurality of brakes or clutches.

Still another object is to provide a transmission which produces a performance range for high performance operation, such as rapid acceleration on hill climbing and a cruising range for economical operation at high speed, together with a simple and easily controlled means to change from one range to the other. In the preferred construction, the control means comprises a friction clutch which can be easily engaged or disengaged even under load.

Still another object is to provide a transmission including a compound planet gear set having a minimum number of gear elements to produce the desired forward and reverse ratios, and which can easily be controlled by simple friction brakes or clutches.

A further object is to provide a transmission in which a hydraulic torque converter functions as a fluid brake to retard the vehicle as in descending grades in any operation range. According to one feature of the invention, the stator in the torque converter is provided with a manually controllable brake to hold it against forward rotation so that it acts as a fluid reaction member to produce a fluid drag on the output shaft.

Another object is to provide a planetary transmission employing one planetary gear cage only, and incorporating the above features.

Still another object is to accomplish the shift from performance range to cruising range by shifting one clutch only, and still further to bring about two path power flow simultaneously therewith and by shifting that one clutch.

The above and other objects and advantages of the invention will be more readily apparent from the following description when read in connection with the accompanying drawings in which:

Figure 1 is an axial section with parts in elevation of a transmission embodying the invention;

Figures 2 and 3 are partial sections on the lines 2—2 and 3—3 respectively of Figure 1 illustrating the differential gearing; and Figure 4 is a diagrammatic view of a control system for the transmission.

The transmission as shown in Figure 1 comprises a fixed outer housing or casing 10 which can be mounted in place of the usual transmission casing in a vehicle, and in which all of the transmission parts are enclosed. Within one end of the housing is mounted a torque converter comprising a driving member or impeller 11 which may be connected directly to the engine crankshaft shown at 12. The impeller carries a series of vanes 13 and may be provided with a housing 14 extending over the remaining parts of the torque converter. Within the impeller housing is mounted a driven rotor having a hub 15 carrying spaced sets of vanes 16 and 17. A stator 18 is mounted adjacent the rotor and carrying a set of stator vanes 19 lying between the spaced sets of rotor vances. The stator is supported on a hub 21 and is normally held against reverse rotation by a one-way brake 22 acting between the hub 21 and a fixed extension 23 of the outer casing. If desired, an automatic ratchet 24 may be provided to connect the stator to the rotor so that the stator vanes 19 will register with the rotor vanes 16 and 17 under certain operating conditions as more particularly described and claimed in my co-pending application Serial Number 38,803, filed July 15, 1948.

The torque converter drives the driven or output shaft 25 of the transmission through a compound planetary gear set enclosed in the housing 10. As shown, the gear set comprises four sun gears 26, 27, 28 and 29, a single ring gear 31 and a single gear carrier 32 carrying planet pinions. As shown, a set of simple planet pinions 33 are rotatably mounted on the carrier and mesh with the sun gear 26. The pinions 33 mesh with the large ends of the compound planet pinions 34 rotatably mounted on the carrier. The large ends of the pinions 34 also mesh with the sun gears 27 and 28 and reduced portions 35 of the pinions 34 mesh with the sun gear 29 and with the ring gear 31. The planet carrier 32, as shown, is directly connected to the driven shaft 25, which may in turn be connected to the wheels of the vehicle through the usual differential and rear axle.

The rotor of the torque converter is connected to the sun gear 26 through a sleeve shaft 36 and the sun gear 27 is secured to a shaft 37 extending through the shaft 36. At its forward end the shaft 37 is connectable through a clutch indicated generally at 38 to the driving shaft. The clutch 38 is shown as a multiple disc clutch which may be engaged by admitting fluid pressure to an operating piston 39, although any other type of clutch could be employed.

In order to change the effective speed and torque ratios provided by the transmission, friction brakes 41, 42 and 43 are provided engageable respectively with the ring gear 31 with a flange 44 connected to the sun gear 29 and with a collar 45. A one-way brake 46 acts between the collar 45 and an extension on the sun gear 28 to hold the sun gear 28 against reverse rotation. The brakes 41, 42 and 43 are normally disengaged and are adapted to be engaged by operating rods 47, 48 and 49 engageable with cam projections on a sliding cam bar 51. The cam bar 51 may be shifted by hand aided by a vacuum motor 52 to control the brakes as more fully described and claimed in my copending application Serial Number 24,158, filed April 30, 1948.

When the cam bar 51 is shifted to the left, the center cam projection thereon will shift the rod 48 to engage the brake 42 for low speed drive. A further shift of the cam bar to the left will release the brake 42 and engage the brake 41 for reverse. Shifting the cam bar to the right from the position shown will engage the brake 43 for normal forward drive.

In the low drive position with the brake 42 engaged, the sun gear 29 will be held against rotation. At this time, with the engine running and the shaft 12 turning forward, the torque converter will turn the sun gear 26 forward tending to rotate the planet pinions 33 backward. The planet pinions 33 will cause the pinions 34 to rotate forward so that they will roll around the stationary sun gear 29 to drive the planet carrier and the driven shaft forward at reduced speed and multiplied torque. It will be noted that this is a positive gear reduction in series to the torque converter to provide a torque multiplication equal to that of the torque converter times that of the gearing so that a high torque multiplication is produced. In normal operation, the use of the low gear drive as described is not necessary and it is provided primarily for extreme or emergency conditions. For example, the gear ratio may be such that the mechanical reduction through the gearing will be on the order of 2.2 to 1, which with a torque increase in the torque converter of 2 to 1 and a rear axle ratio of 3.3 to 1 will give an overall ratio between the engine and rear wheels of 14.5 to 1. Since the torque converter is variable between 2 to 1 and 1 to 1, the maximum range of torque multiplication in the low gear position will be from 14.5 to 1 to 7.25 to 1.

In reverse with the brake 41 engaged, the ring gear 31 will be held stationary and forward rotation of the sun gear 26 will again cause the pinions 34 to turn forward. As best seen in Figure 3, this will cause the reduced portions 35 of the compound pinions 34 to roll backward about the ring gear, thereby driving the carrier and the driven shaft backward. With the gearing as shown, this will produce an overall ratio between the engine and rear wheels of from 11.9 to 1 to 5.94 to 1.

For forward drive in the performance range, the brake 43 is engaged and the other brakes and clutch 38 are disengaged. At this time, the one-way brake 46 will hold the sun gear 28 against reverse rotation so that forward rotation of the pinions 34 produced by forward drive of the sun gear 26 will cause the pinions to roll around the sun gear 28 and drive the carrier and the driven shaft forward. With the gear set as shown, this will produce an overall ratio between the engine and rear wheels of 10.1 to 1 to 5.06 to 1. This is the performance operating range and provides overall ratios sufficient to produce rapid acceleration and satisfactory hill climbing at high speeds.

For still lower numerical ratios to produce a cruising range, the clutch 38 is engaged to connect the sun gear 27 to the driving shaft. When the clutch 38 is engaged, both sun gears 26 and 27 will be turning forward. It will be noted by reference to Figure 2 that the torque on the sun gear 27 tends to turn the pinions 34 backward so that when the torque load is not excessive, the entire gear set will turn as a unit. This results in a non-regenerative division of torque as more fully described and claimed in my Patent No. 2,242,515. In this driving condition with the gear set as shown, the overall ratio between the engine and the rear wheels can vary from about 5.28 to 1 to 3.3 to 1. Thus, a high speed ratio drive is provided to provide relatively high vehicle speeds with relatively low engine speeds so that economical cruising of the vehicle can be accomplished.

It will be noted that the ratio change between the performance range and the cruising range is a relatively small one not exceeding a maximum of about 1.7 to 1. This is an important feature since it enables the change to be made between the performance and cruising ranges without shock in either direction. Preferably, the ratio change is on the order of 1.5 to 1, but for smooth operation should not exceed 1.7 to 1 as described. It will be noted that the ratios in the performance range and the cruising range overlap so that a smooth change can be produced.

It will be further noted that the change from performance to cruising range is made by engaging or disengaging the friction clutch 38 without disturbing any other part of the mechanism except that in cruising range, the one-way brake 46 will over-run. Since the clutch 38 can be engaged or disengaged under load, it is not necessary to synchronize any parts of the transmission, and the change in either direction can occur without interruption of torque.

A further advantage of the cruising range as described is that the provision of two paths of power flow in this range makes it possible to employ a somewhat larger torque converter than would be permissible with a straight through power flow, while at the same time carrying torque multiplication to as high or higher speeds. This results in not only a reduction of engine speed and improved performance in the cruising range but also in less slip because the divided torque reduces the torque load on the torque converter and because with divided torque a larger torque converter or one with less slip characteristics can be employed.

In descending relatively steep grades to obtain maximum engine braking, the transmission may be shifted into its low gear position with the brake 42 engaged to produce the maximum gear ratio between the engine and the wheels. According to the present invention, this is unnecessary due to provision of a brake as shown at 55 engageable with a brake flange 56 connected to the stator hub 21. The brake 55 can be engaged at will under the control of the operator through any suitable mechanism to hold the stator against either reverse or forward rotation. Under over-running conditions, the stator acts as a fluid reaction member to impose a fluid drag on rotation of the driven rotor thereby to exert a braking effort on the sun gear 26 and the shaft. By the use of this brake, the fluid drag is added to the braking effect of the engine so that less gear reduction is required to produce a braking force, and so that the engine can rotate at lower speed thereby reducing engine wear and producing higher economy. With the stator brake 55 relatively steep grades can be descended with safety without requiring a shift into the low gear position, although for extreme conditions the transmission may be shifted into low gear drive, if desired.

The clutch 38 can be controlled to engage and disengage at the desired times by the mechanism illustrated more particularly in Figure 4. As shown in this figure, liquid may be supplied to the piston 39 to engage the clutch 38 through a passage 57 formed in the hub 12 communicating with a bore through the shaft 37. The bore in the shaft 37 communicates with an annular space 58 around the shaft which in turn communicates with a passage 59 formed at the transmission housing. The passage 59 may be connected by a pipe 61 to a valve indicated generally at 62 which functions to control the supply of liquid under pressure to the piston 39 or to exhaust the liquid. As will be apparent when liquid is supplied, the clutch 38 will be engaged while when the liquid is exhausted the clutch will disengage.

The valve 62 comprises a valve body having an inlet port 63 and an exhaust port 64 and with registering passages for both of the ports communicating with the pipe 61. A plunger 65 is slidable in the valve body and is formed with a passage 66 adapted to register with one or the other of the ports 63 or 64. The plunger is shifted by a pair of solenoid coils 67 and 68 to move the passage 66 into register with one or the other of the ports. Liquid is supplied to the valve by a pump 69 which may be driven by a worm gear 71 on the shaft 36, as seen in Figure 1. The inlet side of the pump is connected by a pipe 72 to an oil sump 73 and also communicates with the exhaust port 64. Preferably the pipe 72 is restricted to insure that the pump will maintain suction on the port 64 to withdraw liquid from the piston 39 when the clutch 38 is to be released. The discharge side of the pump is connected through a pipe 74 to the inlet port 63. Preferably, a relief valve 75 is provided which will open under a predetermined pressure to discharge liquid back to the sump. The valve may also control flow of liquid to a pipe 76 which is connected to the torque converter to supply liquid thereto for filling the circuit.

The valve 62 is adapted to be controlled manually and may also have an automatic control responsive to the output speed of the transmission. For manual control the usual accelerator pedal for controlling the engine throttle position may be utilized. As shown, the accelerator pedal 76 is pivoted in the usual manner and is connected to a switch arm 77 which is movable over contacts 78 and 79. When the accelerator pedal is in its released position or is somewhere between its released and approximately half depressed position, the contact arm 77 will engage the contact 78. When the accelerator pedal is depressed slightly beyond its full open throttle position, the contact arm will engage the contact 79.

As shown, the contact arm 77 is connected to a source of voltage such as a battery 81, and the contact 78 is connected through a wire 82 to switch contacts 83 and 84. The contact 79 is connected through a wire 85 to a switch contact 86. The switch arm 77 is connected through a wire 87 to a switch contact 88.

The switch contacts 83 and 88 form parts of pairs of contacts which are completed by contacts 89 and 91, both of which are connected through a wire 92 to the coil 67. Similarly, the contacts 84 and 86 are paired with contacts 93 and 94 which are connected through a wire 95 to the coil 68.

The pairs of contacts, as above described, are adapted to be bridged by switch members 96 and 97 carried respectively by springs 98 which are fixedly mounted at one end and which carry the switch members near their free ends. The free ends of the springs are connected to a block 99 which is rotatable on the upper end of a governor stem 101 to be raised and lowered by the governor action. As shown, the governor comprises weights 102 pivoted on a rotating shaft 103 which may be driven through a worm gear 104 on the transmission output shaft 25 as seen in Figure 1. The weights 102 have projecting arms engaging a collar on the lower end of the shaft 101 to raise the shaft as the speed increases.

The parts are shown in Figure 4 in the position they will occupy at low speed or when the vehicle is at rest. In this position the block 99 is in its lowermost position so that the springs 98 will move the switch members 96 and 97 downward to bridge the contacts 84 and 93 and 86 and 94. At this time the coil 68 is energized to shift the valve to the position shown so that the oil is exhausted from the piston 39 and the clutch 38 is disengaged. As the speed increases, the block 99 will be moved upward, and at some preset speed, as, for example, thirty miles per hour, will raise the switch member 96 from the contacts 84 and 93. It will be understood that all of the contacts may be spring loaded so that they can follow the switch members to a desired extent to produce opening and closing of the circuits in the desired sequence.

When the switch member 96 moves upward and interrupts the circuit between contacts 84 and 93, it will engage the contacts 83 and 89 to complete a circuit through the coil 67 to shift the valve 65 to the right. At this time oil under pressure will be supplied from the pump to the piston 39 to engage the clutch 38 and change the transmission to its two path cruising range. Even after the switch arm 77 moves off of the contact 78 the transmission will remain in the cruising range during normal operating conditions because the valve 65 will remain shifted to the right until the coil 68 is again energized.

When it is desired to shift back to the performance range as, for example, to pass an overtaken vehicle or for hill climbing, the accelerator pedal may be completely depressed to bring the switch arm 77 into engagement with the contact 79. At this time if the speed is low enough so that the switch member 97 is still in engagement with the contacts 86 and 94, a circuit will be completed through the coil 68 to shift the valve 65 to the left thereby releasing the clutch 38. Thus the driver can shift to the performance range at any time he desires.

In order to prevent a shift to the performance range when the vehicle speed is above a predetermined value, the contacts 88 and 91 are provided. When the vehicle speed reaches some preset values as, for example, sixty miles per hour, the governor will move the switch member 97 up out of engagement with the contacts 86 and 94 and into engagement with the contacts 88 and 91. With the switch member in this position, the coil 67 will always be energized through the circuit including the wire 87 and the contacts 88 and 91 so that the transmission will remain in the cruising range. Thus the operator cannot effect an undesirable shift into performance range at high speeds. The governor may be damped in any desired manner as, for example, by a motion damping device 105 of the type more particularly described and claimed in my copending application Serial No. 743,799, filed April 25, 1947, and now abandoned.

While one embodiment of the invention has been shown and described in detail herein, it will be understood that it is illustrative only and is not to be taken as a definition of the scope of the invention, reference being had for this purpose to the appended claims.

What is claimed is:

1. A transmission for connecting a driving shaft to a driven shaft comprising a hydraulic torque converter having a driving member connected to the driving shaft and a driven member, a planetary gear set including a plurality of sun gears and a gear carrier having planet pinions thereon meshing with the sun gears, the planet pinions including a first pinion meshing with one of the sun gears and a second pinion meshing with the first pinion, a ring gear meshing with the second pinion, the planet carrier being permanently connected to the driven shaft, a permanent connection between the driven member and one of the sun gears, brake means to hold a second of the sun gears against rotation, brake means to hold the ring gear for reverse drive, and a clutch to connect a third of the sun gears to the driving member.

2. A transmission for connecting a driving shaft to a driven shaft comprising a hydraulic torque converter having a driving member connected to the driving shaft and a driven member, a planetary gear set including compound planet pinions and simple pinions meshing therewith, a ring gear meshing with the compound planet pinions, and a plurality of sun gears one of which meshes with the simple pinions and others of which mesh with the compound pinions, means to connect said one of the sun gears to the driven member, a carrier for the pinions connected to the driven shaft brake means to hold one of said other sun gears against rotation to provide a reaction gear, brake means to hold the ring gear for reverse drive, and means including a clutch for driving another of said other sun gears directly from the driving shaft.

3. A transmission for connecting a driving shaft to a driven shaft comprising a hydraulic torque converter having a driving member connected to the driving shaft and a driven member, a planetary gear set including compound planet pinions and simple pinions meshing therewith, a ring gear meshing with the planet pinions, and a plurality of sun gears one of which meshes with the simple pinions and others of which mesh with the compound pinions, means to connect said one of the sun gears to the driven member, a one-way brake to hold one of said other sun gears against reverse rotation, a brake to make said one-way brake effective or ineffective, a brake to hold the ring gear against rotation for reverse drive, a carrier for the planet pinions and simple pinions connected to the driven shaft, a clutch for connecting another of said other sun gears to the driving shaft, and a brake to hold a third of said other sun gears against rotation to provide a positive low gear drive.

4. A transmission for connecting a driving shaft to a driven shaft comprising a planetary gear set including a planet carrier permanently connected to the driven shaft, compound planet pinions and single pinions rotatably mounted on the carrier in meshing relationship, three sun gears meshing respectively with the simple pinions and with different portions of the compound pinions, a one way brake to hold one of the sun gears against reverse rotation, a hydraulic torque converter having a vaned driving member permanently connected to the driving shaft, a vaned driven member and a vaned stator, a one way brake to hold the stator against reverse rotation, a permanent connection between the vaned driven member and a second of the sun gears, and a mechanical clutch to connect the driving shaft directly to a third of the sun gears and a brake to hold the stator against forward rotation.

ADIEL Y. DODGE.

REFERENCES CITED

The following references are of record in the file of this patent:

UNITED STATES PATENTS

| Number | Name | Date |
| --- | --- | --- |
| 1,256,373 | Rowledge | Feb. 12, 1918 |
| 1,946,200 | Easter | Feb. 6, 1934 |
| 2,277,214 | Dodge | Mar. 24, 1942 |
| 2,329,724 | Maurer | Sept. 21, 1943 |
| 2,332,593 | Nutt | Oct. 26, 1943 |
| 2,368,684 | Simpson | Feb. 6, 1945 |
| 2,372,817 | Dodge | Apr. 3, 1945 |
| 2,374,303 | Osborne | Apr. 24, 1945 |
| 2,408,008 | Tipton | Sept. 24, 1946 |